United States Patent Office 2,723,964
Patented Nov. 15, 1955

2,723,964
ORGANOSILOXANE ELASTOMERS

Earl Leathen Warrick, Pittsburgh, Pa., assignor to Dow Corning Corporation, Midland, Mich., a corporation of Michigan No Drawing. Application May 8, 1953,
Serial No. 353,899

Claims priority, application Great Britain May 27, 1952

6 Claims. (Cl. 260—37)

This application relates to siloxane rubbers.

Heretofore, siloxane rubbers have been prepared commercially by the vulcanization of polymeric organosiloxanes with organic peroxides. The fillers employed have been inorganic fillers such as silica and metallic oxides. The use of inorganic fillers have been promoted due to the fact that the organosiloxane elastomers are used at elevated temperatures. It would be natural, therefore, to conclude that inorganic fillers would impart more heat stability.

The inorganic fillers may be divided generally into two classes. The first class is the so-called non-reinforcing fillers such as metallic oxides, diatomaceous earth and clays. When these fillers are employed, the resulting vulcanized siloxane elastomers have efficiencies of the order of 75. The term "efficiency" as employed herein is the product of the tensile strength of the elastomer in p. s. i. times the per cent elongation at break divided by 1,000. The second class of inorganic fillers is the so-called reinforcing type which includes silica aerogels and fumed silicas. When this type filler is employed, the resulting elastomers have an efficiency of the order of 300. However, this efficiency drops to 200 or less after 24 hours heating at 250° C.

The applicant has discovered unexpectedly, that this decrease in efficiency of siloxane elastomers upon heating is obviated by employing certain organic fillers. In fact, the efficiency improves with aging at high temperatures.

This invention relates to siloxane elastomers comprising a polymeric, benzene-soluble, diorganosiloxane having a viscosity of at least 20,000 cs. at 25° C. and from 30 to 100 parts by weight based on 100 parts by weight polymer of certain water-insoluble polynuclear benzenoid organic compounds having a particle size of less than 150 millimicrons.

Any water-insoluble, polynuclear benzenoid organic compound having the following properties is operative as a filler in this invention. The organic compound must have a particle size of less than 150 millimicrons, it must melt above 250° C. and be stable to oxidation for at least 24 hours at 250° C. and it must be inert towards the organopolysiloxane (i. e. it must not cause depolymerization of the polysiloxane). Compounds which are illustrative of such fillers are condensed ring benzenoid hydrocarbons having at least 5 rings, such as perylene, coronene, and 2,3,8,9-dibenzcoronene; thioindigoid dyes such as "Thio Fast Red N. V. 6606" which is sold by Harmon Color Works, Inc., Paterson, New Jersey, and phthalocyanines such as copper phthalocyanine, magnesium phthalocyanine, and chlorinated copper phthalocyanines.

For the purpose of this invention, the particle size was determined by the method of Carmin and Malherde, Journal of the Society of Chemical Industry, volume 69, pages 135 to 143 (1950). In event that the filler as prepared does not have the required particle size, it may be reduced thereto by the so-called salt-milling method. This comprises ball-milling the pigment with steel balls and sodium chloride. When the correct particle size has been obtained, the salt is extracted with water and the filler dried before use.

The polymers employed in this invention are diorganopolysiloxanes which are benzene soluble and which have a viscosity of at least 20,000 cs. at 25° C. These polymers may range in physical state from relatively fluid materials to non-flowing solids.

Any monovalent hydrocarbon substituted polysiloxane or halogenated monovalent hydrocarbon substituted polysiloxane having the required viscosity, is within the scope of this invention. However, the preferred organic radicals are those which have superior thermal stability such as methyl, phenyl and halogenated phenyl radicals together with limited amounts of vinyl and ethyl radicals. In all cases, it is preferred that at least 50 per cent of the total number of organic radicals in the polysiloxane be aliphatic radicals. Specific examples of siloxanes which are operative herein are dimethylpolysiloxane, phenylmethylpolysiloxane, diphenylpolysiloxane, vinylphenylpolysiloxane, phenylethylpolysiloxane, trifluorototylmethylpolysiloxane [$F_3CC_6H_4(CH_3)SiO$] and chlorophenylmethylpolysiloxane. Copolymers of these siloxanes are also operative.

The vulcanizing agents employed in this invention are organic peroxides. The preferred vulcanizing agent is tertiary butylperbenzoate although other agents such as benzoylperoxide, paradichlorobenzoylperoxide and tertiary perbutylperacetate may be employed. The peroxides may be used either alone or admixed.

Normal fabrication methods are employed to compound the elastomers. The polymer, vulcanizing agent and filler are milled and thereafter the material is heated in a press at 150° C. for about 10 minutes. This treatment produces an initial set. The stress-strain properties of the elastomer are greatly improved by further curing at 250° C. This after cure may be carried out in any convenient apparatus.

The elastomers of this invention are useful for electrical insulation and other uses for which siloxane elastomers are employed.

The following examples are illustrative only and should not be construed as limiting the invention which is properly delineated in the appended claims.

Example 1

100 parts by weight of a non-flowing benzene soluble copolymeric siloxane having the composition 5 mol per cent phenylmethylsiloxane and 95 mol per cent dimethylsiloxane was milled with 30 parts by weight of copper phthalocyanine having a particle size of 49.2 millimicrons, and 3 parts by weight tertiary butylperbenzoate were milled on a 3-roll mill until a uniform mix was obtained and thereafter heated at 150° C. for 10 minutes. The resulting elastomer had a tensile strength of 293 p. s. i. and an elongation at break of 500 per cent. After heating 24 hours at 250° C., the tensile was 351 p. s. i. and the elongation was 550 per cent at break.

Example 2

100 parts of the siloxane polymer of Example 1 was milled with 75 parts of copper phthalocyanine having a particle size of 49.2 millimicrons and 3 parts by weight tertiary butylperbenzoate. The material was vulcanized by heating 10 minutes at 150° C. whereupon the elastomer had a tensile strength of 383 p. s. i. and an elongation at break of 594 per cent. The sample was heated 24 hours at 250° C. whereupon the elongation at break was 871 per cent and the tensile strength was 848 p. s. i.

Example 3

100 parts by weight of a non-flowing benzene-soluble dimethylpolysiloxane was milled with 75 parts of phthalocyanine having a particle size of 68 millimicrons, and 65 parts by weight tertiary butylperbenzoate. The material was vulcanized by heating 10 minutes at 150° C. and the resulting elastomer had a tensile strength of 333 p. s. i. and an elongation of 718 per cent at break. After heating 24 hours at 250° C. the tensile strength was 304 p. s. i. and the per cent elongation at break was 535.

*Example 4*

The experiment of Example 3 was repeated except that the filler employed was 75 parts of a chlorinated copper phthalocyanine having 14 chlorine atoms per molecule and having a particle size of less than 150 millimicrons. The compounded material was vulcanized as above and the tensile strength was 303 p. s. i. and the elongation at break was 763 per cent. After heating 24 hours at 250° C. the tensile strength was 532 p. s. i. and the elongation was 867 per cent at break.

*Example 5*

100 parts by weight of the polymer of Example 3 was milled with 5 parts by weight tertiary butylperbenzoate and 89 parts by weight of thioindigoid dye sold under the name "Thio Fast Red M. V. 6606" by Harmon Color Works, Inc., Paterson, New Jersey. This material had a particle size of 57.7 millimicrons. The milled material was heated for 10 minutes at 150° C. whereupon the tensile strength was 198 p. s. i. and the elongation at break was 875 per cent. After heating 24 hours at 250° C. the tensile strength was 478 p. s. i. and the elongation at break was 523 per cent.

That which is claimed is:

1. A heat-hardenable composition of matter comprising a polymeric benzene soluble diorganopolysiloxane wherein the organic radicals are of the group consisting of monovalent hydrocarbon radicals and halogenated monovalent hydrocarbon radicals, said siloxane having a viscosity of at least 20,000 cs. at 25° C. and from 30 to 100 parts by weight based on 100 parts by weight siloxane of a water-insoluble, polynuclear benzenoid organic compound having a particle size of less than 150 millimicrons and a melting point above 250° C., selected from the group consisting of condensed-ring benzenoid hydrocarbons having at least 5 rings, thioindigoid dyes and phthalocyanines, said benzenoid compound being stable to oxidation for at least 24 hours at 250° C. and being inert towards the polysiloxane.

2. A heat-hardenable composition of matter comprising (1) a polymeric benzene soluble diorganopolysiloxane wherein the organic radicals are of the group consisting of monovalent hydrocarbon radicals and halogenated monovalent hydrocarbon radicals, said siloxane having a viscosity of at least 20,000 cs. at 25° C., (2) from 30 to 100 parts by weight based on 100 parts by weight siloxane of a water-insoluble, polynuclear benzenoid organic compound having a particle size of less than 150 millimicrons and a melting point above 250° C., selected from the group consisting of condensed-ring benzenoid hydrocarbons having at least 5 rings, thioindigoid dyes and phthalocyanines, said benzenoid compound being stable to oxidation for at least 24 hours at 250° C. and being inert towards the polysiloxane and (3) a peroxide vulcanizing agent.

3. A heat-hardenable composition of matter comprising (1) a benzene soluble methylphenylpolysiloxane having a viscosity of at least 20,000 cs. at 25° C., at least 50 per cent of the organic radicals in said polysiloxane being methyl, (2) from 30 to 100 parts by weight based on 100 parts by weight of the siloxane of a water-insoluble, polynuclear benzenoid organic compound having a particle size of less than 150 millimicrons and having a melting point above 250° C., selected from the group consisting of condensed-ring benzenoid hydrocarbons having at least 5 rings, thioindigoid dyes and phthalocyanines, said benzenoid compound being stable to oxidation and being inert towards the polysiloxane and (3) a peroxide vulcanizing agent.

4. A compound in accordance with claim 3 wherein the benzenoid compound is a phthalocyanine.

5. A heat-hardenable composition of matter comprising (1) a benzene soluble dimethylpolysiloxane having a viscosity of at least 20,000 cs. at 25° C., (2) from 30 to 100 parts by weight based on 100 parts by weight of the siloxane of a water-insoluble, polynuclear benzenoid organic compound having a particle size of less than 150 millimicrons and having a melting point about 250° C., selected from the group consisting of condensed-ring benzenoid hydrocarbons having at least 5 rings, thioindigoid dyes and phthalocyanines, said benzenoid compound being stable to oxidation and being inert towards the polysiloxane and (3) a peroxide vulcanizing agent.

6. A compound in accordance with claim 5 wherein the benzenoid compound is a phthalocyanine.

References Cited in the file of this patent

UNITED STATES PATENTS

| 2,557,928 | Atkinson | June 26, 1951 |

FOREIGN PATENTS

| 464,159 | Canada | Apr. 4, 1950 |
| 852,425 | Germany | Oct. 16, 1952 |